(12) United States Patent
Mihelich

(10) Patent No.: US 12,245,561 B2
(45) Date of Patent: Mar. 11, 2025

(54) CONTROL SYSTEM FOR CONTROLLING HUMIDITY IN AN INDOOR GROWING ENVIRONMENT

(71) Applicant: Christopher Robert Mihelich, Kalamazoo, MI (US)

(72) Inventor: Christopher Robert Mihelich, Kalamazoo, MI (US)

( * ) Notice: Subject to any disclaimer, the term of this patent is extended or adjusted under 35 U.S.C. 154(b) by 162 days.

(21) Appl. No.: 17/652,091

(22) Filed: Feb. 22, 2022

(65) Prior Publication Data

US 2023/0014943 A1 Jan. 19, 2023

Related U.S. Application Data

(60) Provisional application No. 63/151,512, filed on Feb. 19, 2021.

(51) Int. Cl.
*A01G 9/24* (2006.01)
*G05D 22/02* (2006.01)

(52) U.S. Cl.
CPC ............ *A01G 9/246* (2013.01); *G05D 22/02* (2013.01)

(58) Field of Classification Search
CPC ........ A01G 9/246; G05D 22/00; G05D 22/02; Y02A 40/25
See application file for complete search history.

(56) References Cited

U.S. PATENT DOCUMENTS

| | | | |
|---|---|---|---|
| 10,405,501 B1 * | 9/2019 | Shelor | A01G 9/26 |
| 11,096,337 B1 * | 8/2021 | Wilson | A01G 9/246 |
| 2020/0163183 A1 * | 5/2020 | Lys | F21S 4/28 |
| 2020/0236870 A1 * | 7/2020 | Lys | G01N 33/246 |
| 2021/0059123 A1 * | 3/2021 | Lys | G06T 5/50 |
| 2021/0059276 A1 * | 3/2021 | Valverde | A23L 11/33 |
| 2022/0192105 A1 * | 6/2022 | Misner | A01G 9/246 |
| 2022/0413166 A1 * | 12/2022 | Saccomanno | A23B 7/015 |
| 2023/0363328 A1 * | 11/2023 | Lys | G01J 3/42 |

* cited by examiner

*Primary Examiner* — Marc E Norman
(74) *Attorney, Agent, or Firm* — Mark L. Maki; Miller Canfield

(57) ABSTRACT

A control system for controlling humidity in an indoor growing environment is provided, which includes software to control the removal of moisture by using current Vapor Pressure Deficit (VPD) as measured in the indoor air space of a grow room in comparison to a target Vapor Pressure Deficit. The temperature and relative humidity in various areas of the grow room are monitored and used by the software to calculate the current VPD and determine a preferred profile for the target VPD. The control system is configured to maintain consistent VPD with moisture removal by a dehumidifier in response to temperature variations throughout a night/day cycle and through successive growth stages to ensure optimal plant growth and transpiration rates.

13 Claims, 4 Drawing Sheets

CONTROL SYSTEM FOR CONTROLLING HUMIDITY IN AN INDOOR GROWING ENVIRONMENT

CROSS REFERENCE TO RELATED APPLICATIONS

This application claims priority of U.S. Provisional Application Ser. No. 63/151,512, the disclosure of which is incorporated herein by reference in its entirety.

FIELD OF THE INVENTION

The invention relates to a control system for an indoor growing environment, and more particularly to a control system, which controls humidity within the growing environment to increase plant yields.

BACKGROUND OF THE INVENTION

When growing certain plants such as cannabis plants in an indoor growing environment such as a greenhouse or other indoor facilities, it is desirable to control humidity. Commonly, the indoor growing environment is controlled by monitoring humidity and controlling humidity with the addition or removal of humidity. Excess humidity is of particular concern and a growing environment may include a humidifier controlled by a dehumidistat, which monitors humidity and dehumidifies the environment to a set humidity level. In more detail, humidity is of particular concern to the indoor growing environment when growing plants in the Cannabaceae family of plants.

An object of the invention is to provide an improved control system for controlling indoor humidity when growing plants in the Cannabaceae family of plants.

More particularly as to the present invention, indoor grow operations which grow plants in the Cannabaceae family may have particular growing requirements in comparison to other types of plants. The Cannabaceae plant family may include plants such as cannabis and related plats such as hemp. Indoor growing operations may monitor humidity to maintain moisture in a particular define range based upon the humidity being detected. For example, the measured humidity may require raising or lowering humidity to a preset target humidity. This may be accomplished by adding or removing humidity but more likely, as a result of the addition of moisture in the indoor air during normal plant growth, the humidity most likely is controlled through dehumidification of the indoor air. This can be controlled through a conventional dehumidistat, which simply turns a dehumidifier on and off in response to measured humidity levels.

With respect to the present invention, instead of controlling removal of moisture in the air with a dehumidistat, the inventive control system includes software to control the removal of moisture utilizing Vapor Pressure Deficit (VPD) as measured in the indoor air space. Vapor-pressure deficit, or VPD, is the difference (deficit) between the amount of moisture in the air and how much moisture the air can hold when it is saturated. Once air becomes saturated, water will condense out to form clouds, dew or films of water over leaves. It is this instance that makes VPD important for greenhouse regulation. This is particularly of concern when growing plants in in the Cannabaceae family such as cannabis. If a film of water forms on a plant leaf, it becomes far more susceptible to rot. For this reason, the ideal range for VPD in a greenhouse is from 0.45 kPa to 1.25 kPa, ideally sitting at around 0.85 kPa. Additionally, as temperature fluctuates, so does the available amount of moisture the air can hold. Maintaining consistent VPD with moisture removal in response to temperature is key to optimal plant growth (transpiration rates) and currently cannot be performed consistently with market offerings today.

The inventive control system preferably may be applied to an indoor grow operation having a grow room in which a collection of plants can be grown, wherein such plants and the normal growing process can produce moisture in the growing area. The control system communicates with a plurality or at least one sensor(s) that are placed within the crop canopy to directly measure Temperature (T) and Relative Humidity (RH) within the canopy at a particular rate, such as 30 second intervals, and/or placed within the room to measure the environmental Temperature (T) and Relative Humidity (RH) within the room. Profiles are assigned to sensors to specify their use. Exemplary locations and labels for the sensors include but are not limited to the Canopy in the region of plant growth or directly there above, Room, such as the growing room, AC Intake measured at an air conditioning intake, AC Output measured at the air conditioning output, and/or External as measured in an area external to the growing room.

The Temperature and Humidity data from the various sensors is received by a server. The server calculates an average of the sensor data to provide an average per sensor profile of Temperature and Humidity values that can be calculated as an average at each sensor or as an average of a predefined group of sensors. The calculated average Temperature and Relative Humidity data are used to calculate Saturation Vapor Pressure (SVP). In this manner, the invention not only monitors one particular location such as the canopy or the room area away from the canopy, but monitors several locations, which can have variations in humidity and temperature. This provides a more encompassing evaluation of the humidity levels encountered at one or more areas of the grow operation.

The current Saturation Vapor Pressure (SVP) and current Relative Humidity (RH) are used to calculate the current Vapor Pressure Deficit (VPD). The SVP is a function of temperature, and the VPD is a function of the SVP. As noted, the SVP and VPD preferably use an average of the sensor profiles for Temperature and Humidity in one or more monitored locations. A target VPD is also determined according to a VPD profile that preferably is predefined in the server and used for comparison purposes.

The current VPD is checked against a profile for the target VPD. If current VPD for a profile chosen to control a space (such as Canopy and/or Room) exceeds the target VPD, dehumidification is terminated. If current VPD for a profile chosen to control (such as Canopy, Room) by is lower than target VPD, dehumidification function is executed. By using VPD using calculations based upon the measured temperature and relative humidity, improved humidity levels are achieved to provide for an improved growing environment. In this regard, in commercial or internal applications of such technology for an indoor growing environment, VPD control has been observed in cannabis plants to unexpectedly produce a 30% increase in yield.

Other objects and purposes of the invention, and variations thereof, will be apparent upon reading the following specification and inspecting the accompanying drawings.

Figure 1:
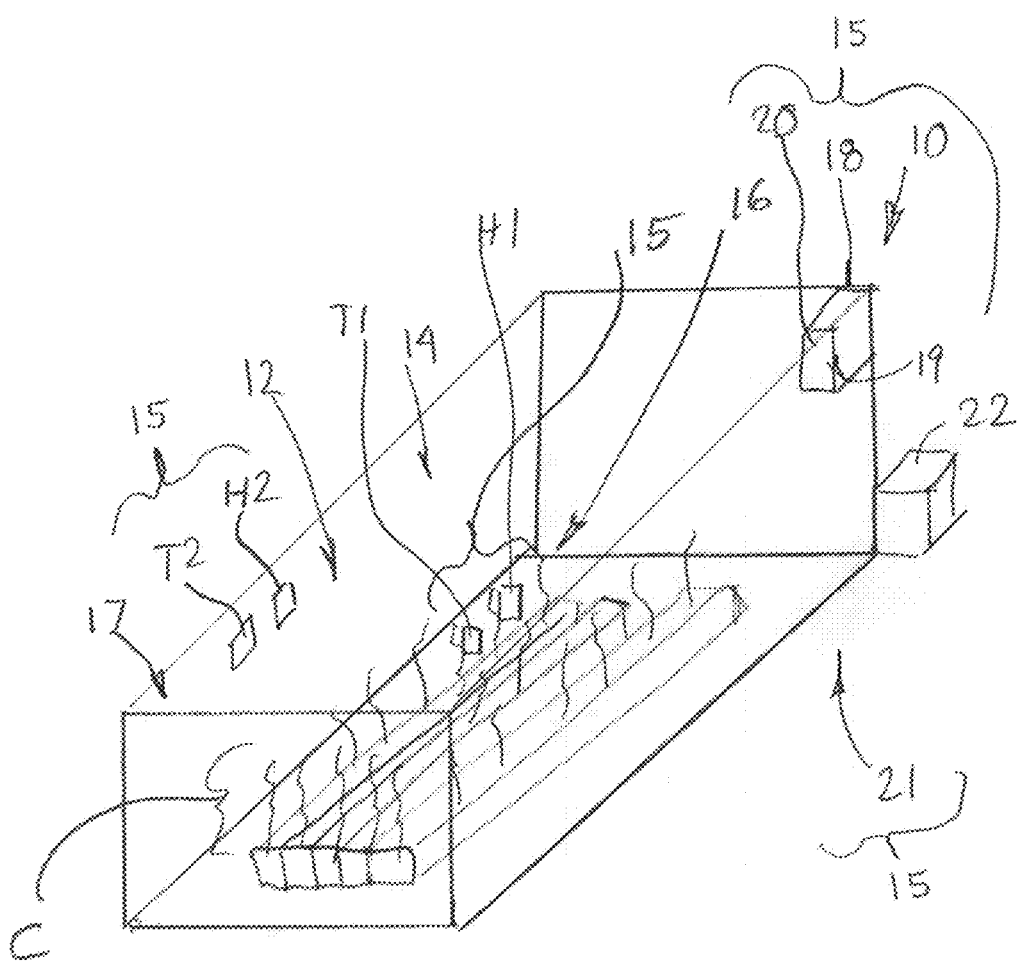
FIG. 1 is a diagrammatic depiction of an indoor growing operation.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Generally, when growing certain plants such as cannabis plants in an indoor growing environment such as a greenhouse or other indoor facilities, it is desirable to control humidity. With respect to the present invention of FIGS. 1-4, instead of controlling removal of moisture in the air with a dehumdistat controlling a dehumidifier, the inventive control system includes software that controls the removal of moisture by utilizing Vapor Pressure Deficit (VPD) as a governing characteristic.

Vapor-pressure deficit, or VPD, is the difference (deficit) between the amount of moisture in the air and how much moisture the air can hold when it is saturated. Once air becomes saturated, water will condense out to form clouds, dew or films of water over leaves. Dew and leaf films are of a concern when growing particular plants, such as cannabis and other related plants in this family. As such, VPD is used in the control system of the present invention to control VPD during the grow cycle, such as the day/night cycle, or more broadly, during an extended grow cycle such as the various growth stages for a particular plant.

Figure 4:
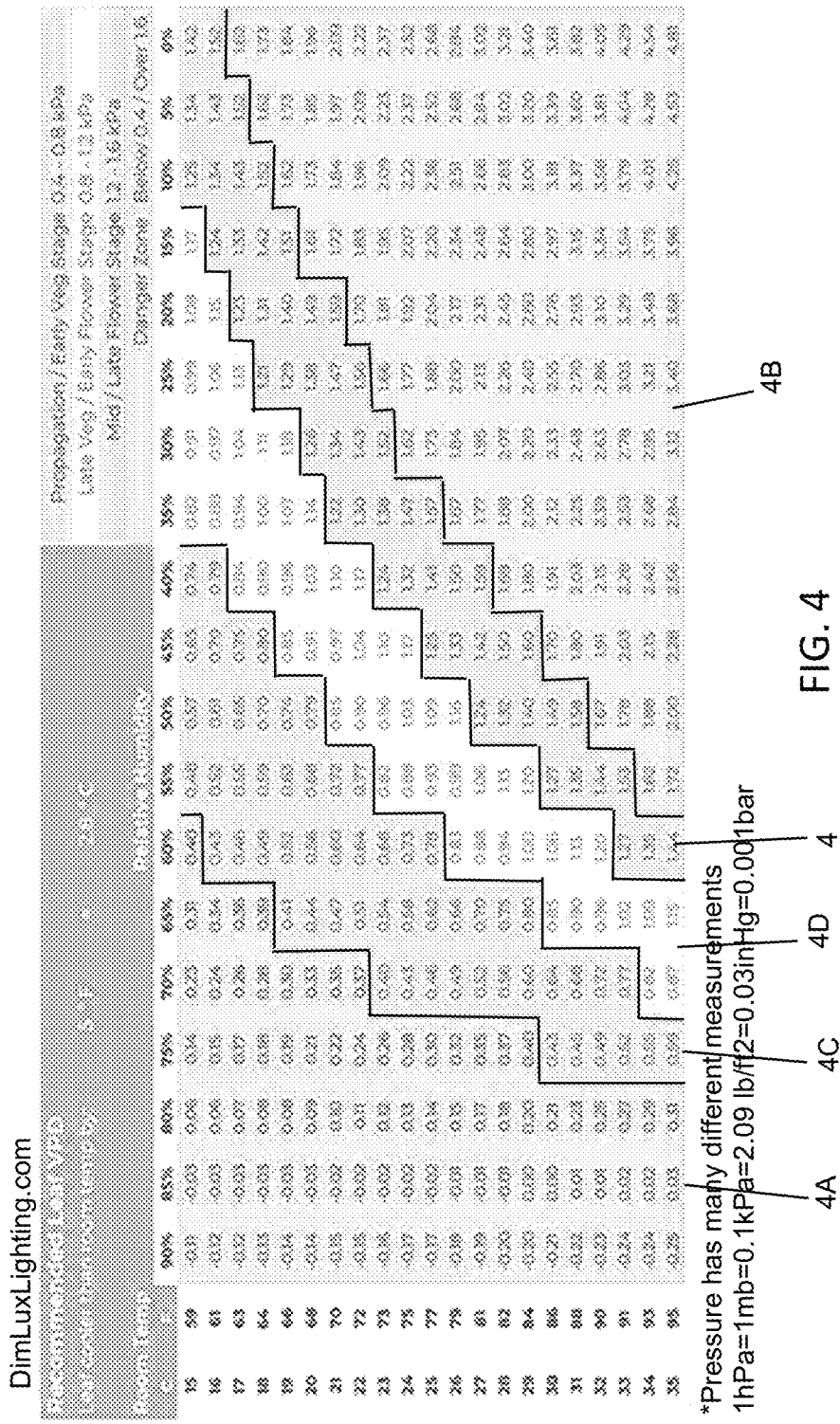
FIG. 4 is a representative VPD chart depicting recommended leaf VPD for plants such as cannabis showing room temp in comparison to relative humidity.

It is this instance that makes VPD important for optimized greenhouse regulation. If a film of water forms on a plant leaf, it becomes far more susceptible to rot. For this reason, the ideal range for VPD in a greenhouse is from 0.45 kPa to 1.25 kPa, ideally sitting at around 0.85 kPa. FIG. 4 provides a chart of recommended leaf VPD with room temperature on the left vertical axis and relative humidity on the top horizontal axis. The graph is provided by dimluxlighting.com. The left and right shaded chart areas 4A and 4B are red danger zones for plant growth, wherein the VPD is below 0.4 and over 1.6 kPa in such zones. The next leftward chart area 4C is a green zone for optimized growth during the propagation/early vegetative stage, which is in the VPD range of 0.4-0.8 kPa. The next middle chart area 4D shows optimized VPD levels for the late vegetative stage, which is in the 0.8-12 kPa range. The next chart area shows the optimized VPD levels for the mid/late flower stage, which is in the VPD range of 1.2-1.6 kPa. This chart shows one form for determining a profile for determining a target VPD for the growth of plants and shows such target VPD during successive growth stages of the plants. As such, the profile for the target VPD may incorporate several variables including temperature, humidity and time.

Additionally, as temperature fluctuates, so does the available amount of moisture the air can hold. According to the present invention, maintaining consistent VPD in the growth environment with moisture removal in response to temperature and changes thereof is key to optimal plant growth (transpiration rates) and currently cannot be performed consistently with market offerings today.

With respect to the inventive control system 10 as diagrammatically shown in FIG. 1, the control system 10 may be applied to an indoor grow operation 12 in a defined location such as a building or facility having a grow room 14. The control system 10 may include a plurality or one or more sensor(s) 15, which may be placed, for example, within the crop canopy C to directly measure Temperature (T) such as by sensor T1 and Relative Humidity (RH) such as by sensor H1 periodically, such as defined 30 second intervals. The sensors 15 may also be placed within the room to measure the environment Temperature (T) and Relative Humidity (RH) such as by sensors T2 and H2. Profiles are assigned to sensors to specify their use. Exemplary locations and labels for the sensors include but are not limited to Canopy in plant growth area 16, Room in the surrounding room area 17, AC Intake 18 in the airflow of an intake side of a dehumidifier 19, AC Output 20 of a dehumidifier output side, and/or External 21 measuring the environmental area external to the grow room 14. The dehumidifier 19 may be configured to control humidity in the grow room 14 by removing moisture by dehumidifying the room although the dehumidifier 19 might have a dual capability of adding moisture or humidifying the room. In some embodiments, the dehumidifier 19 functions to condition the air. The temperature and humidity sensors T and H may be provided in any or all of these areas.

Figure 2:
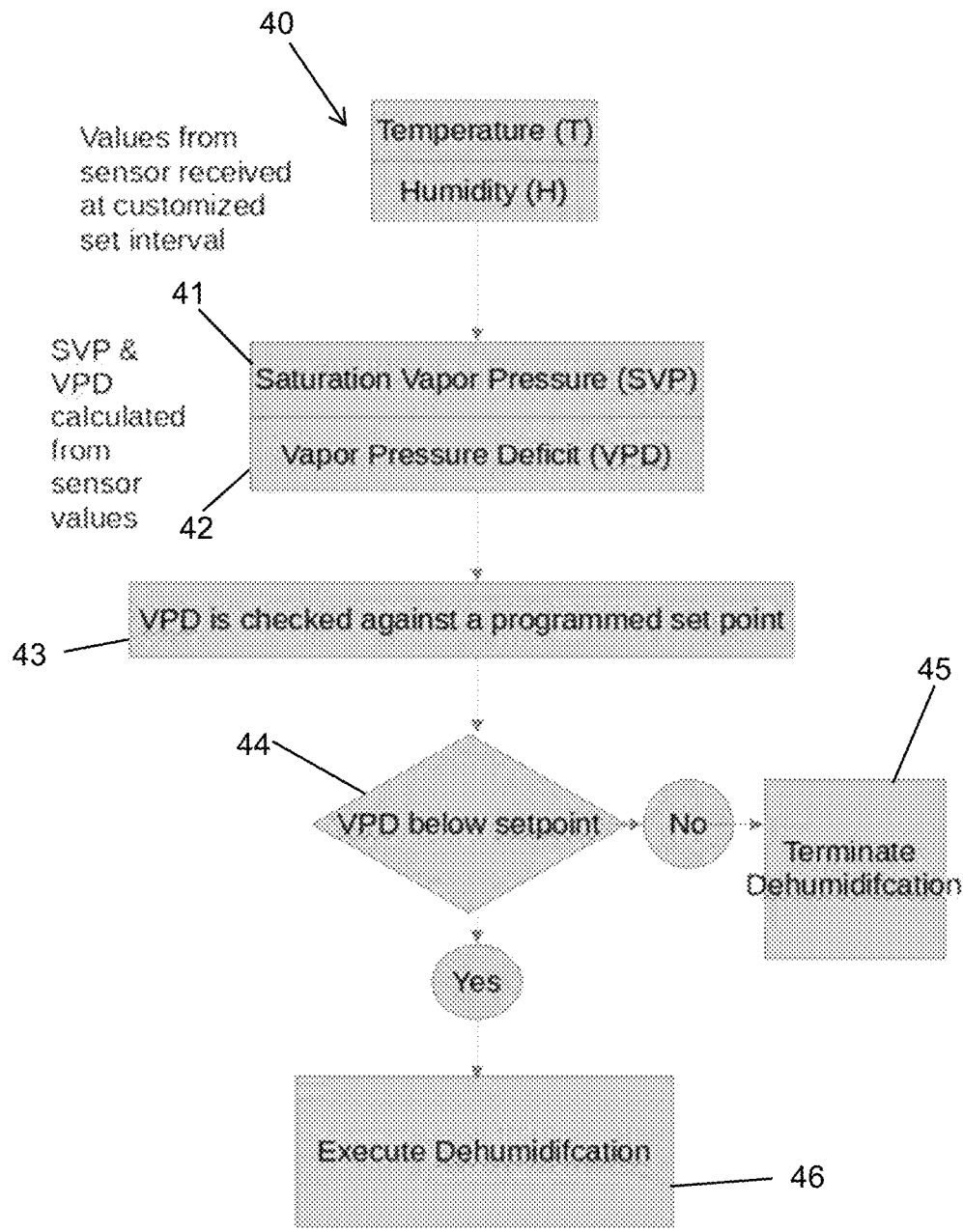
FIG. 2 is a diagrammatic view of the control logic for the system control unit.

Referring to FIGS. 1 and 2, the Temperature and Humidity data from the sensors 15 is received by a server 22 in step 40, which be located within or out of the grow room 14 or more preferably, remote from the indoor grow operation 12, wherein the sensor data may be transmitted through any type of communications protocol both wired or wireless. The server 22 may be configured as a controller or control unit to control the dehumidifier 19, which may be operated to remove or add moisture as growing conditions warrant.

The server 22 is configured to include or communicate with a processor that receives and stores the sensor data and calculates an average of the sensor data to provide an average per sensor profile of Temperature and Humidity values. The calculated average Temperature and Relative Humidity data are used to calculate Saturation Vapor Pressure (SVP) pursuant to the following formula in step 41. In this manner, the invention not only monitors one particular location such as the canopy C or the room area 17 away from the canopy C, but monitors several locations, which can have variations in humidity and temperature. The preferred formulas are as follows:

$$SVP\ kPa = 610.78 * 2.71828^{([T]/([T]+238.3)} * 17.2694)/1000$$

Current saturation Vapor Pressure (SVP) and current Relative Humidity (RH) are calculated from the sensor data and then are used to calculate the current Vapor Pressure Deficit (VPD) in step 42. The vapor-pressure deficit, or VPD, is the difference (deficit) between the amount of moisture in the air and how much moisture the air can hold when it is saturated and is preferably calculated with the formula below. As noted, the SVP and VPD preferably use an average of the sensor profiles for Temperature and Humidity in one or more monitored locations as determined by the sensor data through the server 22 and the processor thereof.

$$VPD\ kPa = ([SVP] * (1 - [RH]/100))$$

T, RH, SVP and VPD are previous values that are also stored by the server or sensors to identify trending within the environment. The sensor values can be stored for the sensors individually and/or as an average thereof.

Technical Description Dehumidification Function

The current VPD is checked against a profile for target VPD such as determined through the data table of FIG. 4 and indicated in step 43 of FIG. 2. The FIG. 4 data can be stored in the server 22 and accessed through the processor thereof to determine the target VPD, such as for a particular temperature or pressure. The server 22 then determines if the VPD is below the setpoint or target VPD in step 44. If current VPD for a profile chosen to control a space (such as Canopy and/or Room) exceeds the target VPD, dehumidification is terminated in step 45. If current VPD for a profile chosen to control (such as Canopy, Room) is lower than target VPD, dehumidification function is executed in step 46.

Dehumidification is controlled by 110 to low voltage relays to trigger on cycles of the humidifier 19, which can dehumidify the room. Commands for on or off are issued and received over the internet and supplied by a remote server 22 although the server 22 may also be locally located.

By providing a controller for each one or a plurality of daisy chained dehumidifiers 19, a priority and run time is assigned. As run time is exceeded by primary dehumidification, secondary, tertiary, etc. dehumidification controllers are triggered on with a run time value to each assigned.

Technical Description Profile

The profile for the target VPD is stored on the server 22 and may contain various types of data, which are used to calculate the target VPD for any particular temperature and humidity combination and may also take into account other crop characteristics. Various combinations of such characteristics can be derived from the table of FIG. 4. The profile may contain the crop start date, calculated crop age, VPD setting, and high/low VPD dead band, and leaf offset setting. Profile segments with different VPD settings per crop age can be saved and recalled being utilized as a profile for future crops. As such, the invention can adjust for preferred VPD, which may vary with crop age.

Figure 3:
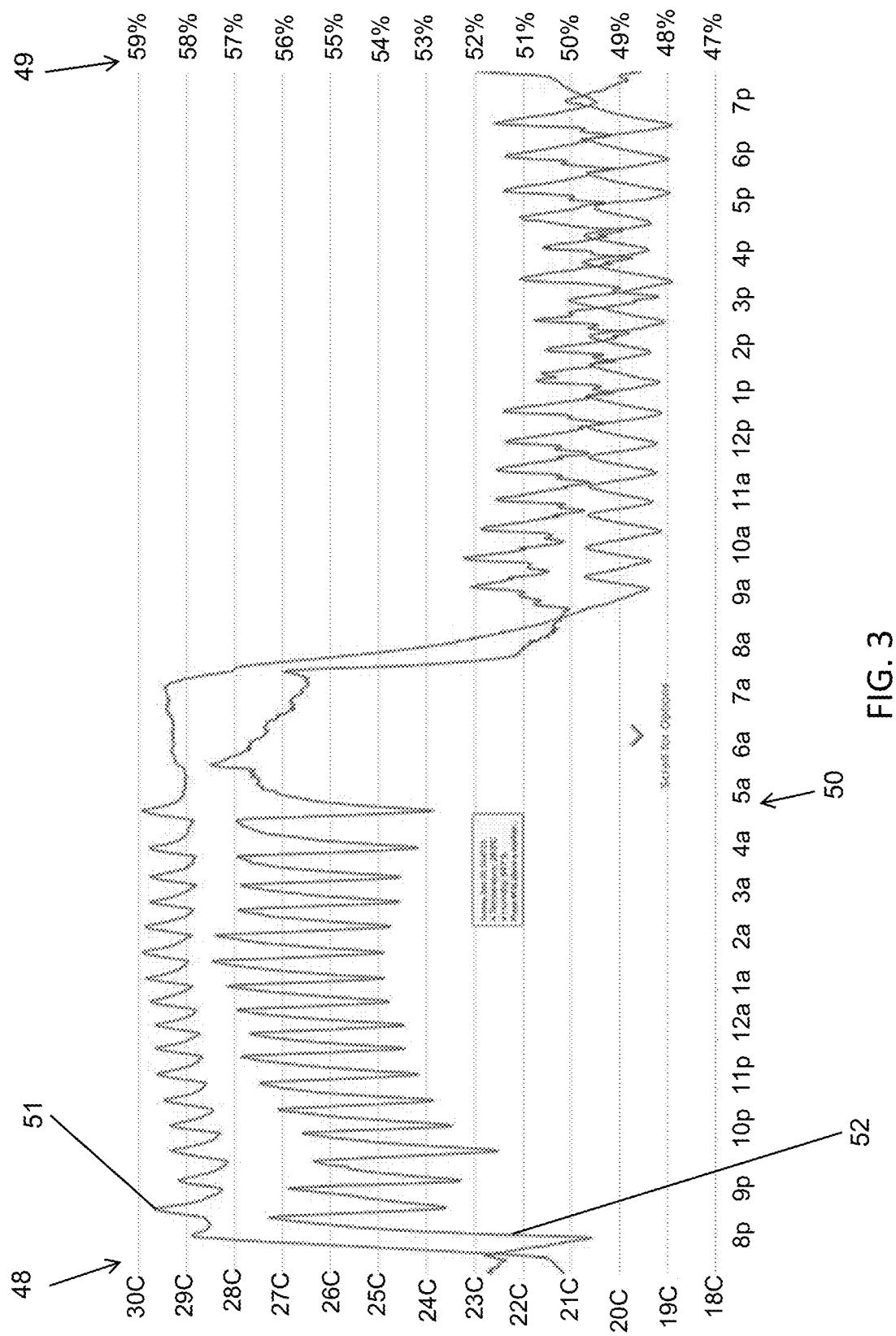
FIG. 3 is a graph of humidity trends for VPD control through a day/night cycle.

Referring to FIG. 3, VPD control is provided throughout a day/night cycle as depicted by this graph having temperature on the left axis 48, humidity on the right axis 49 and hours of the day on the bottom axis 50. The first graph line 51 shows the increases and decreases in temperature with the second graph line 52 showing the corresponding controlled changes in humidity. The humidity 52 trends with temperature 51 to maintain a consistent deficit setpoint for plant transpiration. A normal dehumidistat would have a flat humidity line without regard for temperature which causes VPD and plant transpiration rates to fluctuate, causing stem elongation and pronounced internodal spacing as has been found to occur in cannabis plants. The present invention prevents stem stretch and promotes reduced internodal spacing as observed in cannabis plants.

As noted above, FIG. 4 shows a VPD Chart for plant propagation. Temperature increases the amount of moisture the air can hold. Having a controller 22 that responds to temperature to control VPD allows the environment to maintain a consistent deficit or VPD as temperature fluctuates to provide the unexpected advantages described above.

Although a particular preferred embodiment of the invention has been disclosed in detail for illustrative purposes, it will be recognized that variations or modifications of the disclosed apparatus, including the rearrangement of parts, lie within the scope of the present invention.

What is claimed:

1. A control system for an indoor grow operation having a grow room in a defined area for growing plants, said control system comprising:
   a controller;
   at least one dehumidifier;
   one or more sensors placed in one or more locations of the grow room wherein said locations comprise a crop canopy over the growing plants, a surrounding area of said grow room, a dehumidifier intake, a dehumidifier output and an external area, said sensors operatively connected to said controller and configured to detect both temperature and humidity for each of said locations in which said sensors are placed;
   each of said one or more sensors directly measuring at least one of Temperature and Relative Humidity and said one or more sensors in each of said locations communicating measured Temperature and Relative Humidity values as sensor data to said controller that indicates the measured Temperature and measured Relative Humidity values in each said location;
   said controller comprising a server and a processor configured to receive said sensor data and calculate a calculated average of the sensor data to provide an average per sensor profile of said measured Temperature and Relative Humidity values for said one or more locations, said calculated average of the sensor data being processed by said server to calculate a current Saturation Vapor Pressure (SVP), wherein said current Saturation Vapor Pressure (SVP) and current Relative Humidity (RH) are calculated from said sensor data and then are used to calculate a current Vapor Pressure Deficit (VPD) defined as a difference between an amount of moisture in room air and an amount of moisture the air can hold when it is saturated;
   said server further being configured to determine a profile for a target VPD for the room air wherein said controller controls said dehumidifier to raise and lower room humidity wherein if said current VPD exceeds said target VPD, dehumidification by said dehumidifier is terminated, and if said current VPD is lower than said target VPD, dehumidification by said dehumidifier is executed, whereby said current VPD is controlled continuously to reach said target VPD during crop growth to improve crop yields.

2. The control system according to claim 1, wherein a plurality of said dehumidifiers are provided, which are each assigned a priority relative to any other said dehumidifier and assigned a run time wherein as said run time of one said dehumidifier having a primary priority is exceeded, then a secondary said dehumidifier having a secondary said priority is controlled to vary said current VPD.

3. The control system according to claim 1, wherein said profile for said target VPD contains profile data indicating a calculated crop age and contains VPD ranges corresponding to a plurality of crop growth stages associated with said calculated crop age, said target VPD being determined by the calculated averages for said measured Temperature and Relative Humidity values, and a time variable based upon said calculated crop age, such that target VPD is maintained within said VPD range corresponding to said crop growth stage.

4. The control system according to claim 1, wherein said calculated average of the sensor data is calculated from said measured Temperature and Relative Humidity values for a plurality of said locations which can vary from each other in temperature and relative humidity.

5. The control system according to claim 1, wherein said profile of said target VPD encompasses VPD ranges for said target VPD that vary based upon temperature and relative humidity such that said target VPD is variable by said server based upon said calculated average of the sensor data for the measured Temperature and Relative Humidity values.

6. A control system for an indoor grow operation having a grow room in a defined area for growing plants, said control system comprising:
a controller;
at least one dehumidifier performing dehumidification of said grow room;
one or more sensors located in a plurality of locations of the indoor grow operation wherein each of said locations comprises one of a crop canopy of the growing plants, a surrounding room area of said grow room, a dehumidifier intake, a dehumidifier output and an external area, said sensors in said plurality of said locations being operatively connected to said controller and configured to detect both temperature and humidity for each said location;
each of said one or more sensors in said plurality of said locations directly measuring Temperature and Relative Humidity for each said location and said one or more sensors in each of said locations communicating measured Temperature and Relative Humidity values for each said location as sensor data to said controller that indicates the measured Temperature and measured Relative Humidity values in each said location;
said controller comprising a server and a processor configured to receive said sensor data and calculate a calculated average of the sensor data for said plurality of locations to provide a calculated average of said measured Temperature and Relative Humidity values of said sensor data for said plurality of said locations, said calculated average of the sensor data being processed by said server to calculate a current Saturation Vapor Pressure (SVP), wherein said current Saturation Vapor Pressure (SVP) and current Relative Humidity (RH) are calculated from said sensor data and then are used to calculate a current Vapor Pressure Deficit (VPD) defined as a difference between an amount of moisture in room air indicated by said calculated Relative Humidity and an amount of moisture the air can hold when it is saturated indicated by said current SVP;
said server further being configured to determine a profile for a target VPD for the room air wherein said controller controls said at least one dehumidifier to raise and lower room humidity wherein if said current VPD exceeds said target VPD, said at least one dehumidifier is controlled so that said current VPD lowers, and if said current VPD is lower than said target VPD, said at least one dehumidifier unit is controlled so that said current VPD rises, whereby said current VPD is controlled continuously by said at least one dehumidifier to reach said target VPD during crop growth to improve crop yields.

7. The control system according to claim 6, wherein each of said at least one dehumidifier assigned a priority relative to any other of said at least one dehumidifier and assigned a run time wherein as said run time of one said at least one dehumidifier having a primary priority is exceeded, then a secondary said at least one dehumidifier having a secondary said priority is controlled to vary said current VPD.

8. The control system according to claim 6, wherein said profile for said target VPD contains profile data indicating a calculated crop age and contains VPD ranges corresponding to a plurality of crop growth stages associated with said calculated crop age, said target VPD being determined by temperature and humidity variables based upon the calculated averages for said Temperature and Relative Humidity, and a time variable based upon said calculated crop age, such that target VPD is maintained within said VPD range corresponding to said crop growth stage.

9. The control system according to claim 6, wherein said profile of said target VPD encompasses a VPD range for said target VPD that varies based upon temperature and relative humidity such that said target VPD is variable by said server based upon said calculated average of the sensor data.

10. A control system for an indoor grow operation having a grow room in a defined area for growing plants, said control system comprising:
a controller;
at least one dehumidifier performing dehumidification of said grow room;
one or more sensors located in a plurality of locations of the indoor grow operation wherein each of said locations comprises one of a crop canopy of the growing plants, a surrounding room area of said grow room, a dehumidifier intake, a dehumidifier output and an external area, said sensors in said plurality of said locations being operatively connected to said controller and configured to detect both temperature and humidity for each said location;
each of said one or more sensors in said plurality of said locations directly measuring Temperature and Relative Humidity for each said location and said one or more sensors in each of said locations communicating measured Temperature and Relative Humidity values for each said location as sensor data to said controller that indicates the measured Temperature and measured Relative Humidity values in each said location;
said controller comprising a server and a processor configured to receive said sensor data and calculate a calculated average of the sensor data for said plurality of locations to provide a calculated average Temperature and a calculated average Relative Humidity derived from said sensor data for said plurality of said locations, said calculated average of the sensor data being processed by said server to calculate a current Saturation Vapor Pressure (SVP) based upon said calculated average Temperature, wherein said current Saturation Vapor Pressure (SVP) and current average Relative Humidity (RH) are used to calculate a current Vapor Pressure Deficit (VPD) defined as a difference between an amount of moisture in room air and an amount of moisture the air can hold when it is saturated;
said server further being configured to determine a profile for a target VPD for the room air based upon said current average Temperature and said current average Relative Humidity wherein said controller controls said at least one dehumidifier to raise and lower room humidity wherein if said current VPD exceeds said target VPD, said at least one dehumidifier is controlled so that said current VPD lowers, and if said current VPD is lower than said target VPD, said at least one dehumidifier is controlled so that said current VPD rises, whereby said current VPD is controlled continuously by said at least one dehumidifier to reach said target VPD during crop growth to improve crop yields.

11. The control system according to claim 10, wherein each of said at least one dehumidifier assigned a priority relative to any other of said at least one dehumidifier and assigned a run time wherein as said run time of one said at least one dehumidifier having a primary priority is exceeded, then a secondary said at least one dehumidifier having a secondary said priority is controlled to vary said current VPD.

12. The control system according to claim 10, wherein said profile for said target VPD contains data indicating a calculated crop age, and contains VPD ranges corresponding to a plurality of crop growth stages associated with said calculated crop age, said target VPD being determined by temperature and humidity variables based upon the calculated averages for said Temperature and Relative Humidity, and a time variable based upon said calculated crop age, such that target VPD is maintained within said VPD range corresponding to said crop growth stage.

13. The control system according to claim 10, wherein said profile of said target VPD encompasses a VPD range for said target VPD that varies based upon temperature and relative humidity such that said target VPD is variable by said server based upon said calculated average of the sensor data.

* * * * *